(12) United States Patent
Moya Raposo et al.

(10) Patent No.: US 11,230,656 B2
(45) Date of Patent: Jan. 25, 2022

(54) USE OF BAROCALORIC MATERIALS AND BAROCALORIC DEVICES

(71) Applicants: Cambridge Enterprise Limited, Cambridge (GB); Universitat Politécnica de Catalunya, Barcelona (ES); Universitat de Barcelona, Barcelona (ES)

(72) Inventors: Javier Eduardo Moya Raposo, Cambridge (GB); Alexander Avramenko, Cambridge (GB); Lluís Manosa Carrera, Barcelona (ES); Josep Lluís Tamarit Mur, Barcelona (ES); Pol Marcel Lloveras Muntané, Barcelona (ES)

(73) Assignees: Cambridge Enterprise Limited, Cambridge (GB); Universitat Politécnica de Catalunya, Barcelona (ES); Universitat de Barcelona, Barcelona (ES)

( * ) Notice: Subject to any disclaimer, the term of this patent is extended or adjusted under 35 U.S.C. 154(b) by 151 days.

(21) Appl. No.: 16/341,618

(22) PCT Filed: Oct. 13, 2017

(86) PCT No.: PCT/EP2017/076203
§ 371 (c)(1),
(2) Date: Apr. 12, 2019

(87) PCT Pub. No.: WO2018/069506
PCT Pub. Date: Apr. 19, 2018

(65) Prior Publication Data
US 2020/0123426 A1      Apr. 23, 2020

(30) Foreign Application Priority Data

Oct. 14, 2016 (GB) ..................... 1617508

(51) Int. Cl.
*C09K 5/06* (2006.01)

(52) U.S. Cl.
CPC ..................... *C09K 5/06* (2013.01)

(58) Field of Classification Search
CPC .... C09K 5/06; C09K 5/14; C09K 5/02; F25B 23/00; C04B 35/645
See application file for complete search history.

(56) References Cited

U.S. PATENT DOCUMENTS 3,920,414 A * 11/1975 Steere ..................... C10L 1/143
44/331
2007/0099249 A1* 5/2007 Abbott ................... B82Y 30/00
435/7.5

(Continued)

OTHER PUBLICATIONS

Lloveras et al., Giant barocaloric effects at low pressure in ferrielectric ammonium sulphate, Nov. 26, 2015, Macmillan Publisher LTD., p. 1-6. (Year: 2015).*

(Continued)

*Primary Examiner* — Emmanuel E Duke
(74) *Attorney, Agent, or Firm* — Michael J. Blessent; Bret E. Field; Bozicevic, Field & Francis LLP (57) ABSTRACT

Described herein is the use of organic materials in methods of barocaloric cooling. The barocaloric effects may be exhibited where the organic material is near a non-isochoric phase transition, such as a non-isochoric first-order phase transition. The organic material has one or more carbon atoms and may be an organic compound or a salt thereof. In some cases that organic material is a soft matter material, such as a plastic crystal or a liquid crystal. The methods may be adapted for use of the organic material as a heating agent.

23 Claims, 3 Drawing Sheets

(56) References Cited

U.S. PATENT DOCUMENTS

| | | | | |
|---|---|---|---|---|
| 2010/0060844 A1* | 3/2010 | Sawatari | ............... | G02F 1/1341 349/187 |
| 2016/0017462 A1* | 1/2016 | Samanta | ................. | C22C 30/00 420/581 |

OTHER PUBLICATIONS

Xie et al., Demonstration of liquid crystal for barocaloric cooling application, Sep. 26, 2016 (Year: 2016).*

Vijayakumar et al., Pressure induced phase transitions and equation of state adamantane, Jan. 11, 2001, Institute of Physics Publishing, Journal of Physics: Condensed Matter (Year: 2001).*

Hassine et al., Phase Transition in Hydrogen-Bonded 1-Adamantane-methanol, Jun. 29, 2015, ACS Publication, Crystal Growth & Design (Year: 2015).*

De Oliveria N, Barocaloric effect and the pressure induced solid state refrigerator, Mar. 11, 2011, Journal of Applied Physics 109, 053515 (Year: 2011).*

Lloveras et al., Giant barocaloric effects at low pressure in ferrielectric ammonium sulphate, Nov. 2015, Macmillan, p. 1-6 (Year: 2015).*

Alonso, Efectes barocalòrics en la transiciò plàstica del 1-Bromadamantà, Jun. 2017.

Bell, Cooling, Heating, Generating Power, and Recovering Waste Heat with Thermoelectric Systems, Science Sep. 12, 2008: vol. 321, Issue 5895, pp. 1457-1461.

Bonnot et al., Elastocaloric Effect Associated with the Martensitic Transition in Shape-Memory Alloys, Phys Rev Lett. Mar. 28, 2008;100(12):125901. Epub Mar. 27, 2008.

Catalá, Efectes barocalòrics en cristalls plàstics, Escola Tècnica Superior d'Enginyeria Industrial de Barcelona, Jun. 2016.

Crossley et al., New developments in caloric materials for cooling applications, AIP Advances 5, 067153 (2015) Published Online: Jun. 19, 2015 Accepted: Jun. 2015.

Cui et al., Demonstration of high efficiency elastocaloric cooling with large ΔT using NiTi wires, Applied Physics Letters 101, 073904 (2012).

Esptein et al., Observation of laser-induced fluorescent cooling of a solid, Nature vol. 377, pp. 500-503 (1995).

Goetzler et al., Energy Savings Potential and RD&D Opportunities for Non-Vapor-Compression HVAC Technologies, U.S. Dept. of Energy, Navigant Consulting, Inc. Mar. 2014.

Gomez et al., Efectes barocalòrics colossals en cristalls plàstics derivats del neopentà, Gener 2016.

Hassine et al., Phase Transition in Hydrogen-Bonded 1-Adamantane-methanol, Cryst. Growth Des. 2015, 15, 8, 4149-4155.

Ito, Pressure-induced phase transition in adamantane, Acta Cryst. (1973). B29, 364-365.

Lavrič et al., Direct measurement of elastocaloric effect in nematic liquid crystal elastomer, Condensed Matter Physics Department, Jožef Stefan Institute, 1000 Ljubljana, Slovenia, http://programme.exordo.com/ilcc2014.

Lloveras et al., Giant barocaloric effects at low pressure in ferrielectric ammonium sulphate, Nature Communications vol. 6, Article No. 8801 (2015).

Mañosa et al., Giant solid-state barocaloric effect in the Ni—Mn—In magnetic shape-memory alloy, Nature Materials vol. 9, pp. 478-481 (2010).

Mañosa et al., Inverse barocaloric effect in the giant magnetocaloric La—Fe—Si—Co compound, Nature Communications vol. 2, Article No. 595 (2011).

Matsunami et al., Giant barocaloric effect enhanced by the frustration of the antiferromagnetic phase in Mn3GaN, Nature Materials vol. 14, pp. 73-78 (2015).

Mencke et al., Kinetics and mechanism of the pressure-induced lamellar order/disorder transition in phosphatidylethanolamine: a time-resolved x-ray diffraction study, Biochemistry, 1991, 30 (9), pp. 2453-2463.

Mencke et al., A simple apparatus for time-resolved x-ray diffraction biostructure studies using static and oscillating pressures and pressure jumps, Review of Scientific Instruments 64, 383 (1993).

Mikhaleva et al., Phase Transitions and Caloric Effects in Ferroelectric Solid Solutions of Ammonium and Rubidium Hydrosulfates, Physics of the Solid State Mar. 2011, vol. 53, Issue 3, pp. 510-517.

Mikhaleva et al., Electrocaloric and Barocaloric Effects in Some Ferroelectric Hydrosulfates and Triglycinesulfate, pp. 78-83 |, Accepted Nov. 30, 2011, Published online: Jun. 14, 2012.

Müller et al., Cooling by adiabatic pressure application in Pr1-xLaxNiO3, Appl. Phys. Lett. 73, 1056 (1998).

Oliveria et al., Barocaloric effect and the pressure induced solid state refrigerator, Journal of Applied Physics 109, 053515 (2011).

Patel et al., Elastocaloric and barocaloric effects in polyvinylidene di-fluoride-based polymers, Appl. Phys. Lett. 108, 072903 (2016).

Rodriguez et al., Thermostatic temperature changes in poly(methyl methacrylate) at high hysdrostatic pressure: Experimental, J. Appl Phys. vol. 53 No. 10, Oct. 1982.

Roland et al., Mechanical and Electromechanical Properties of Vinylidene Fluoride Terpolymers, Chem. Mater., 2004, 16 (5), pp. 857-861.

Sinanis et al., Pressure-jump investigations on the kinetics of the isotropic-nematic phase transition of a liquid crystal: Time behavior of the scattered and transmitted light intensities for PCH 5, Ber. Bunsenges. Phys. Chem., 102, (5), S745-750 1998.

Stern-Taulats et al., Barocaloric and magnetocaloric effects in Fe49Rh51, Physical Review B 89(21), May 2014.

Stern-Taulats et al., Inverse barocaloric effects in ferroelectric BaTiO3 ceramics, APL Materials 4, 091102 (2016).

Strässle et al., Magnetic cooling by the application of external pressure in rare-earth compounds, Phys. Rev. B 67, 054407—Published Feb. 6, 2003.

Timmermans, Plastic Crystals: A Historical Review, Journal of Physics and Chemistry of Solids vol. 18, Issue 1, Jan. 1961, pp. 1-8.

Wunderlich et al., Thermotropic Mesophases and Mesophase Transitions of Linear, Flexible Macromolecules, Liquid Crystal Polymers II/III pp. 1-59 Springer-Veriag 1984.

Xiao et al., Significant elastocaloric effect in a Fe-31.2Pd (at. %) single crystal, Applied Physics Letters 102(16), Apr. 2013.

Xie et al., Demonstration of liquid crystal for barocaloric cooling application, Cornell University Library, Sep. 2016.

Yano et al., Dielectric Studies on Phase Transition of Ca2Sr(CH3CH2C00)6 Crystals Doped with HCF2CF2COO/HCF2COO Ion, J. Phys. Soc. Jpn. 58, pp. 577-583 (1989).

Yuce et al., Barocaloric effect in the magnetocaloric prototype Gd5Si2Ge2, Appl. Phys. Lett. 101, 071906 (2012).

Alonso, Efectes barocalòrics en la transiciò plàstica del 1-Bromadamantà, Jun. 2017, with a machine translation.

Catalá, Efectes barocalòrics en cristalls plàstics, Escola Tècnica Superior d'Enginyeria Industrial de Barcelona, Jun. 2016, with a machine translation.

Gomez et al., Efectes barocalòrics colossals en cristalls plàstics derivats del neopentà, Gener 2016, with a machine translation.

* cited by examiner

USE OF BAROCALORIC MATERIALS AND BAROCALORIC DEVICES

RELATED APPLICATION

The present case claims priority to, and the benefit of, GB 1617508.5 filed on 14 Oct. 2016 (14/10/2016), the contents of which are hereby incorporated by reference in their entirety.

FUNDING

The project leading to this application has received funding from the European Research Council (ERC) under the European Union's Horizon 2020 research and innovation programme (grant agreement No 680032).

FIELD OF THE INVENTION

The present invention provides the use of organic materials in methods of barocaloric cooling. The invention also provides for the use of the organic materials to achieve a barocaloric cooling effect, such as in a method of cooling. Also provided is a cooling device comprising an organic material for use as a barocaloric cooling agent.

BACKGROUND

Foodstuffs, beverages, medical products and medical samples, electronics, and populated spaces such as offices, all require cooling. Current refrigeration and air-conditioning units rely primarily on the compression and expansion of environmentally harmful fluids, and there is strong interest in developing cooling systems that avoid such fluids. Recent developments in the field have looked at solid materials that display magnetically, electrically and mechanically driven phase transitions near room temperature. These materials will only gain commercial acceptance if they are shown to be inexpensive and capable of exhibiting large reversible thermal changes driven by applied fields that are easy to generate.

Caloric effects are currently under intense study due to the prospect of environmentally-friendly cooling applications. To date the work in this area has focused on developing large magnetocaloric effects and large electrocaloric effects, but the former require large magnetic fields that are challenging to generate economically and the latter require large electric fields that can typically be applied without breakdown only in thin samples. For these reasons recent work has turned to mechanocaloric effects, such as elastocaloric effects, where the effects are driven by applied uniaxial stress, and barocaloric effects, which are driven by isotropic stress (hydrostatic pressure). These effects are attractive for the reason that mechanical stress is easy to generate and large mechanocaloric effects have been observed at relatively low applied stresses. However, the use of elastocaloric materials is limited, as these materials exhibit plastic flow which develops in the MPa range for metallic materials. For barocaloric materials there are no energy losses or mechanical breakdown associated with plastic deformation.

Large barocaloric effects (also referred to as BC effects) driven by hydrostatic pressure near phase transitions have been observed, but generally only in a small number of relatively expensive magnetic materials. Here, changes of magnetization are accompanied by changes in volume, with or without changes in crystal symmetry.

It is known that first-order phase transitions release or absorb latent heat. This latent heat may be released or absorbed by the application of a specific field, which in the case of barocaloric materials is the application of a mechanical stress, and more accurately, the application of hydrostatic pressure. Large barocaloric effects are observed near the phase transition temperature when the first-order phase transition is induced by the applied isotropic stress.

For example, Matsunami et al. have described large barocaloric effects enhanced by the frustration of the antiferromagnetic phase in $Mn_3GaN$. Here, the large barocaloric effects are caused by an enhancement of the ratio of volume change against the pressure coefficient of the Néel temperature. The phase transition occurs around 290 K. The material shows a pressure-driven isothermal entropy change of around 21 $J K^{-1} kg^{-1}$ due to a change in hydrostatic pressure of 0.09 GPa (with respect to ambient pressure), providing a barocaloric strength of 232 $J K^{-1} kg^{-1} GPa^{-1}$ ($|\Delta S|/|\Delta p|$ which is maximized with the smallest $|\Delta p|$ compatible with maximizing $|\Delta S|$), and a refrigerant capacity of 125 $J kg^{-1}$.

Recently the present inventors have described larger barocaloric effects at low pressures in ferrielectric ammonium sulfate (see Lloveras et al.). Here ammonium sulfate undergoes a first-order transition between a centrosymmetric orthorhombic structure and an orthorhombic polar structure at around 220 K. The large barocaloric effects are connected with pressure-driven changes in ionic ordering, which contrast with the smaller effects observed in magnetic materials, which are linked to pressure-driven changes in the density of electronic states near the Fermi level.

Ammonium sulfate shows a pressure-driven isothermal entropy change of around 60 $J K^{-1} kg^{-1}$ due to changes in hydrostatic pressure of 0.10 GPa (with respect to ambient pressure), providing a barocaloric strength of 600 $J K^{-1} kg^{-1} GPa^{-1}$, and a refrigerant capacity of 276 $J kg^{-1}$.

There is a desire to identify materials exhibiting large barocaloric effects, and most particularly it is desirable to identify materials displaying a large isothermal entropy change at relatively low pressure. It is helpful to identify those materials exhibiting a large adiabatic temperature change in response to an applied isotropic stress, as well as those materials having a relative large latent heat. There is also the practical need to identify materials where a phase transition occurs near ambient temperatures.

SUMMARY OF THE INVENTION

In a general aspect the invention provides for the use of an organic material, such as an organic material having a molecular weight of 2,000 or less, as a barocaloric cooling agent, for example where the organic material is used near a non-isochoric phase transition, such as a non-isochoric first-order phase transition. The methods that permit the use of the organic material as a cooling agent may be adapted for use of the organic material as a heating agent.

Until now the materials known to provide significant barocaloric effects have been generally limited to inorganic materials, such as $Mn_3GaN$ and ammonium sulfate. The inventors have found that organic materials that display volume changes due to first-order phase transitions may be used to provide a barocaloric effect. These organic materials typically display a very large pressure-driven shift in the phase transition temperature. Indeed, small changes in hydrostatic pressure are seen to drive giant barocaloric effects at or near phase transition in these materials.

The barocaloric effects for the organic materials are comparable to or exceed those previously observed for inorganic materials, such as magnetic, ferroelectric and ferrielectric inorganic materials. The organic materials are therefore suitable for use in barocaloric cooling methods and cooling devices. For example, the pressure-driven isothermal entropy change values for the organic materials, such as plastic crystals, may be comparable to or exceed those reported for $Mn_3GaN$ or ammonium sulfate. The latent heat values and adiabatic temperature changes for the organic materials, such as plastic crystals, may be comparable to or exceed those reported for $Mn_3GaN$ or ammonium sulfate. Furthermore, the phase transition temperatures for the organic materials may lie closer to ambient temperatures compared with a material such as ammonium sulfate.

The pressures required to drive the phase transition in the organic materials may also be small compared with the pressures required for the inorganic materials. The phase transitions in organic materials also have latent heat values that are comparable to those reported for the materials currently used in refrigerators and air-conditioning units.

The organic materials are attractive for the reason that they are widely available, and many materials can be obtained on a large scale, at low cost, and the materials have low toxicity, and can be easily and readily disposed of after use. In these respects the use of organic materials has an advantage over the previously reported barocaloric methods which use magnetic materials.

In one aspect of the invention there is provided the use of an organic material as a barocaloric cooling agent. Here, a barocaloric effect, which is typically a large barocaloric effect, may be developed from a relatively low applied hydrostatic pressure.

In a second aspect of the invention there is provided a method of cooling, such as a barocaloric cooling method, the method comprising the steps of:

(i) applying hydrostatic pressure to an organic material; and
(ii) permitting heat flow from or to the organic material, such as from or to the organic material;
(iii) releasing hydrostatic pressure from an organic material that is under applied pressure; and
(iv) permitting heat flow to or from the organic material, such as to or from the organic material.

The method of the invention may comprise repeating steps (i) to (iv), for example to provide sustained cooling. The steps may be repeated as often as is required to provide the desired cooling effect.

A barocaloric organic material is a compound, or a salt of that compound, having a carbon atom, and optionally having one or more carbon-carbon bonds and/or one or more carbon-hydrogen bonds.

The barocaloric organic material may be a material having an observable first-order phase transition. Thus, the phase transition of the organic material may comprise a first-order phase transition, or the phase transition is a first-order phase transition.

The barocaloric organic material may have a molecular weight of 2,000 or less, such as 1,000 or less. Here, the organic material is not a polymer.

The barocaloric organic material may be a plastic crystal.
The barocaloric organic material may be a liquid crystal.
The barocaloric organic material may be an alkyl carboxylate salt.

In the methods of the invention, the hydrostatic pressure is applied near the transition temperature of the organic material, such as a temperature near and above the transition temperature (for conventional barocaloric materials) or near and below the transition temperature (for inverse barocaloric materials). It is here that large barocaloric effects are observed. For example, the hydrostatic pressure is applied at a temperature that is within 50 K, such as within 20 K, such as within 15 K, such as within 10 K, such as within 5 K, such as within 2 K, such as within 1 K, such as within 0.5 K of the transition temperature, which is the transition temperature of the organic material absent the applied hydrostatic pressure (for example, the transition temperature under ambient pressure).

In the methods of the invention, the hydrostatic pressure may be applied at a level sufficient to induce the phase transition.

In another aspect of the invention there is provided a cooling apparatus, the apparatus comprising an organic material as a barocaloric cooling agent.

The apparatus may also comprise means for applying hydrostatic pressure to the organic material.

The apparatus may also comprise means for transferring heat to and from the organic material.

The organic material may be provided in a pressure-transfer medium, such as a pressure transfer fluid.

These and other aspects and embodiment of the invention are described in further detail below.

DETAILED DESCRIPTION OF THE INVENTION

As noted previously, large barocaloric effects driven by hydrostatic pressure near first-order phase transitions have been experimentally observed in a small number of relatively expensive magnetic materials, where changes of magnetization are accompanied by changes in volume, with or without changes in crystal symmetry.

Recent experimental work from the present inventors has shown that large barocaloric effects are observed in ammonium sulfate near the first-order ferrielectric phase transition of this inorganic material.

The present inventors have now established that organic materials, such as those that display non-isochoric phase transitions, and particularly non-isochoric first order phase transitions, can provide large barocaloric effects. These organic materials may be used as alternatives to the inorganic materials that have previously been described for use in barocaloric cooling.

Rodriguez et al. have described the barocaloric temperature changes of poly(methyl methacrylate) under high applied hydrostatic pressure. However, the hydrostatic pressure is not apparently applied at a temperature close to a first-order phase transition of the polymer. Patel et al. have described the elastocaloric in the polyvinylidene difluoride (PVDF) polymer, and barocaloric effects in the polyvinylidene difluoride-trifluoroethylene-chlorotrifluoroethylene (PVDF-TrFE-CTFE) polymer. The authors estimate the barocaloric response of a ferroelectric polymer near its first-order ferroelectric phase transition. The estimation is based on volume versus temperature data originally reported by Roland et al.

Mikhaleva et al. have described very small barocaloric effects in triglycinesulfate (TGS) near a second-order ferroelectric phase transition. The authors describe these effects as insignificant, and they did not propose the use of TGS in cooling applications.

Xie and Zhu have suggested that dihexadecylphosphatidylethanolamine (DHPE), used in excess water, would exhibit barocaloric effects. Their suggestion is based on earlier reported work by Mencke et al. who described a transition of the phospholipid from a lamellar liquid crystal to a lamellar gel when the material was subjected to a pressure jump (from 20 to 60 MPa). Mencke et al. detected a temperature change that occurred approximately at the same time as this transition, but this temperature change was likely to have arisen due to pressure-driven temperature changes in water away from any transition, as recognised by the authors in their original paper, and as shown via basic thermodynamical calculations using water.

The work of Mencke et al. is intended to exemplify a new apparatus for time-resolved X-ray diffraction studies using static and oscillating pressures and pressure jumps. There is no suggestion in this paper that organic materials would be generally useful in providing barocaloric cooling within a cooling apparatus.

The organic materials for use in the present case are also preferably lower molecular weight compounds and the salts thereof. Furthermore, the methods of the invention apply pressure at close to, such as within 50 K of, such as within 10 K of, the phase transition temperature of the organic material.

Organic Material

The organic material for use in the present invention may be an organic compound or a salt thereof. References to the organic compound may include a reference to the ionic form of the compound, as appropriate. Generally, the organic material has a molecular weight that is 2,000 or less. Thus, the organic materials for use in the present case are preferably small molecular weight compounds, and the salts thereof.

The organic compound, or the ionic form of the compound, has one or more carbon atoms, and most typically two or more carbon atoms. The organic compound will usually possess one or more carbon-carbon bonds, such as two or more carbon-carbon bonds. The organic material may therefore be contrasted with an inorganic material, which does not contain a carbon atom.

The organic compound, or the ionic form of the compound, will typically also contain hydrogen, and the material will usually have one or more carbon-hydrogen bonds, such as two or more carbon-hydrogen bonds.

The organic compound may additionally contain heteroatoms, such as nitrogen, oxygen, sulfur and/or fluorine atoms. The organic compound may therefore contain one or more carbon-heteroatom bonds, such as carbon-oxygen bonds.

The organic compound may contain one or more groups selected from alkyl, alkenyl, alkynyl, cycloalkyl, heterocyclyl, aryl including carboaryl and heteroaryl.

Multiple groups of the same type may be present in the organic compound. For example, an organic material may contain a plurality of cycloalkyl, heterocyclyl, or aryl groups.

Where the organic compound contains ring systems, such as cycloalkyl, heterocyclyl, or aryl groups, these groups may include fused ring systems. For example, an organic material exemplified herein is adamantane, which may be regarded as having fused cycloalkyl groups.

In addition the organic compound may contain one or more groups selected from halo, hydroxyl, carboxyl, oxo such as keto and acyl, ester, carbonate, amino, amido, carbamate, carbamide (urea), cyano, nitrile and nitro.

The carboxyl group may be in ionic form as a carboxylate together with an appropriate counter cation.

The amino group may be in ionic form as a quaternary amine together with an appropriate counter anion.

The organic compound may contain an alkyl group, such as a $C_{1-12}$ alkyl group.

The organic compound may itself be a hydrocarbon. The organic compound may be an alkane, including linear and branched alkanes, or a cycloalkane, such as those having fused carbocyclic rings, such as an alkane or cycloalkane having 4 or more, such as 5 or more, such as 10 or more, carbon atoms. For example, 1,3-dimethyladamantane may be used as an organic material in the methods of the present case.

The organic compound may contain an aryl group, such as a carboaryl or a heteroaryl group. The carboaryl group may be phenyl or naphthyl.

In one embodiment, the organic compound is not a salt.

In one embodiment, the organic material is a salt of an organic compound. Here, the counter ion to the ionic form of the organic compound may be a metal ion or an organic ion. Although a metal counter ion may be present, the material may nevertheless be referred to as an organic material owing to the organic character of the ionic form of the organic compound.

A metal ion may be a mixed metal ion. For example, in the worked examples of the present case a mixed Ba and Ca counter ion is present in a propionate salt and a butyrate salt, and a mixed strontium and calcium counter ion is present in a propionate salt.

In one embodiment, the organic material does not contain a metal.

In one embodiment, the organic material does not contain a metal selected from the group consisting of Group 3 to 16 metals, such as Group 3 to 12 metals.

In other embodiments, the organic material does contain a metal. Typically, where a metal is present it is a counter ion to an ionic form of the organic compound. Thus, the metal is typically a cationic species. Where a metal is present it may be a Group 1 and/or a Group 2 metal. The examples in the present case include anionic forms of organic compounds together with Group 2 metal cations, such as barium, calcium and strontium cations.

In one embodiment, the organic material is an alkyl carboxylic acid or an alkyl carboxylate salt, and preferably an alkyl carboxylate. The alkyl group may have three or more carbon atoms, such as 3 or 4 carbon atoms (including the carbon atom provided by the acid group). The worked examples in the present case show barocaloric effects provided by propionate and butyrate salts.

In one embodiment, the organic material may be an alkyl carboxylic acid or an alkyl carboxylate salt where one or more, such as one or two, hydrogen atoms may be substituted with fluorine. The present inventors have found that alkyl carboxylates may be used in the methods of the present invention and fluorinated versions of the alkyl carboxylates are known to have a number of phase transitions at around ambient temperature and below. For example, Yano et al. describe the phase transitions of alkyl carboxylates and fluorinated alkyl carboxylates.

In some embodiments, the organic material is not an aminocarboxylic acid salt such as an amino acid salt, for example, a triglycine salt. In particular, the organic material is not an amino acid sulfate. Preferably the organic material is not triglycine sulfate (TGS). Triglycine sulfate is also known as glycine sulfate.

In one embodiment, the organic material is a soft matter material, such as a plastic crystal or a liquid crystal.

A plastic crystal typically has long-range translational order, which may be seen, for example, in the X-ray diffraction pattern for the material, where sharp Bragg peaks are visible, but there is no orientational order.

A liquid crystal has little or no long-range translational order, but orientational order is present. Thus, Bragg peaks are not visible in the X-ray diffraction pattern of the material. Further, plastic crystals have globular motifs, whereas liquids crystals have non-globular motifs.

An organic material having a plastic crystal phase, where there is no orientational order of the crystals, may be converted to or from a phase where there is orientational order, for example with a change in the temperature. Such a phase transition may be used in the methods of the invention.

A description of organic materials having plastic crystal character is provided by Timmermans, the contents of which are hereby incorporated by reference. A description of organic materials having plastic crystal or liquid crystal character is provided by Wunderlich et al., the contents of which are hereby incorporated by reference.

The worked examples in the present case describe the use of organic materials having a plastic crystal character. Examples include neopentane and adamantane derivatives, such as 1-adamantanol.

The plastic crystal may comprise an alkyl group or a cycloalkyl group.

The cycloalkyl group may be an adamantyl group. The adamantyl group may be optionally substituted with one or more groups selected from the group consisting of alkyl, halo, hydroxyl and oxo.

The alkyl group may be a $C_{4-20}$ alkyl group, such as a $C_{4-5}$ alkyl group. The alkyl group is optionally substituted with one or more groups selected from the group consisting of hydroxyl, amino and nitro.

The worked examples in the present case describe the use of an organic material having a liquid crystal character. An example includes the liquid crystal PCH5.

The liquid crystal may comprise one or more groups selected from alkyl, cycloalkyl and aryl, such as wherein the liquid crystal has an alkyl group, a cycloalkyl group and an aryl group.

In one embodiment, the organic material is not lyotropic. Thus, the organic material may not be a phospholipid. Typically, the organic material is not provided, such as dispersed, within a solvent, such as water.

An organic material may contain one or more different organic compounds or salts thereof, and each of these compounds or salts may be as described herein. The individual compounds or their salts may have different transition temperatures. Such composites can be operated in a parallel or a cascade mode in order to enhance the temperature span of operation.

The organic materials for use in the present case are typically small molecular weight compounds.

The organic material may have a molecular weight that is at least 50, at least 65, at least 70, at least 100, or at least 150.

The organic material may have a molecular weight that is at most 500, at most 700, at most 1,000, at most 2,000, at most 5,000 or at most 10,000.

The organic material may have a molecular weight that is in a range selected from the lower and upper limits given above. For example, the organic material may have a molecular weight that is in the range 50 to 1,000, such as 100 to 500.

Typically, the organic compound is not a high molecular weight compound, such as a polymer.

It is noted that the work of Patel et al. uses a PVDF having a molecular weight of 530,000. The molecular weight of the PVDF-TrFE-CTFE polymer used by the authors is not reported. Rodriguez et al. study thermoelastic changes in poly(methyl methacrylate). The authors admit that they did not determine the molecular weight of the polymer or its size distribution.

The organic material may not be poly(methyl methacrylate), a polyvinylidene difluoride-containing polymer, such as polyvinylidene difluoride (PVDF) or PVDF-TrFE-CTFE, or a phospholipid, such as dihexadecylphosphatidylethanolamine (DHPE).

Where the organic material is a salt, the molecular weight may be the molecular weight of the ionic form of the organic compound, or the molecular weight of the ionic form of the organic compound together with its counter ion.

The organic material is usually provided within a pressure transmitting medium, which may be a fluid or a solid material, and such are described in further detail below in the detailed description of the methods of the invention. The organic material is typically not provided in water.

The organic material exhibits certain thermodynamic properties, and these are described below.

Organic Material Properties

The organic materials for use in the present case display barocaloric effects under applied isotropic stress. A reference to organic materials displaying conventional barocaloric effects is also a reference to organic materials displaying inverse barocaloric effects.

Organic materials are generally expected to display conventional barocaloric effects under applied isotropic stress, where the material has a reduced volume at lower temperatures across the phase transition. However, inverse barocaloric effects may be observed in organic materials and such materials are equally useful in the methods of the invention. References to the properties of the organic materials are generally made with respect to those displaying conventional barocaloric effects. However, these references may be construed as references to materials displaying inverse effects, with the skilled person understanding the behaviour of those materials being opposite to those of conventional materials.

The organic material is a solid or it may have the characteristics of a mesophase, for example the organic compound may be a liquid crystal or plastic crystal, such as determined at ambient temperature, such as 270, 280 or 300 K, or at a lower temperature, such as 100, 150, 200, or 250 K, and at ambient pressure, such as at 101.3 kPa.

An organic material for use in the present invention may be a material having a reversible phase transition at a temperature lying in the range 100 to 450 K, such as 200 to 450 K, such as at ambient pressure, such as at 101.3 kPa.

A phase transition may be a transition between solid, plastic and liquid crystal phases. A phase transition may also be a transition between solid phases, or a transition between liquid crystal phases, or a transition between plastic crystal phases, or a transition between liquid and solid phases. In the present case the methods of cooling based on the barocaloric effect make use of these transitions occurring within the range 100 to 450 K, such as within the range 200 to 450 K, and most preferably the methods of the invention make use of transitions between or within solid and plastic crystal phases.

In some embodiments the phase transition is or comprises a first order phase transition, such as a transition between a mesophase, for example, a liquid crystal or plastic crystal phase, and a solid or liquid phase. Preferably, the transition is a first order phase transition.

Without wishing to be bound by theory, an ideal first-order phase transition is a transition in which the molar Gibbs energies or molar Helmholtz energies of the two phases (or chemical potentials of all components in the two phases) are equal at the transition temperature, but their first derivatives with respect to temperature and pressure (for example, specific enthalpy of transition and specific volume) are discontinuous at the transition point, as for two dissimilar phases that coexist and that can be transformed into one another by a change in a field variable such as pressure, temperature, magnetic or electric field.

The inventors have previously found that ammonium sulfate undergoes a transition between a centrosymmetric orthorhombic structure and an orthorhombic polar structure at around 220 K.

An organic material may undergo a displacive or order-disorder phase transition.

The organic materials for use in the present case include alkyl carboxylate salts, such as BDP and BDB. The phase transition observed with these materials is a structural phase transition from cubic symmetry to orthorhombic symmetry, which leads to large changes in the volume of the organic material.

In other embodiments of the invention, organic materials having a plastic crystal phase are provided. The phase transition in these materials may be between the plastic crystal phase and the solid phase. For example, the phase transition, such as on cooling, may be between an orientationally disordered crystal phase and an orientationally ordered crystal phase.

In other embodiments of the invention, organic materials having a liquid crystal phase are provided. The phase transition in these materials, such as on cooling, may be between an orientationally disordered liquid phase and an orientationally ordered liquid phase. Additionally or alternatively, the phase transition may be between a liquid phase and a solid phase.

Other types of phase transition may be utilised in the methods of the invention.

Examples of other types of transition include a phase transition between solid and liquid phases. Such transitions may be utilised with alkane compounds, for example. In a further example, such transitions may be utilised with liquid crystals.

The organic material typically does not exist in the gas phase in the temperature range 100 to 450 K, such as within the range 200 to 450 K, such as at ambient pressure, such as at 101.3 kPa. The methods of the invention do not make use of transitions to or from the gas phase.

For example, the organic material has a reversible phase transition that may lie at a temperature of at least 100, at least 150, at least 200, at least 210, at least 220, at least 230, at least 240, at least 245, at least 250, at least 260, at least 270, or at least 280 K. For example, the reversible phase transition may lie at a temperature of at most 310, at most 315, at most 320, at most 330, at most 340, at most 350, at most 360, at most 370, at most 380, at most 390, at most 400, or at most 450 K.

In one embodiment, the organic material has a reversible phase transition lying in a temperature range selected from the minimum and maximum temperatures given above. For example, the organic material has a reversible phase transition lying in the temperature range 245 to 340 K, such as 245 to 315 K or 280 to 330 K.

Most preferably the phase transition lies at a temperature that is close to, or at, ambient temperatures. Thus, as noted above, the reversible phase transition may lie at a temperature in the range 245 to 340 K, such as 245 to 315 K or 280 to 330 K.

More preferably, the phase transition for a material exhibiting conventional barocaloric effects lies at a temperature that is below ambient temperature, such as below 250 K. When hydrostatic pressure is applied to the organic material the transition temperature may be shifted to a temperature that lies within the ambient range or above, such as within the range 250 to 340 K, such as 270 to 340 K, such as 280 to 330 K.

More preferably, the phase transition for a material exhibiting inverse barocaloric effects lies at a temperature that is above ambient temperature, such as above 350 K. When hydrostatic pressure is applied to the organic material the transition temperature may be shifted to a temperature that lies within the ambient range or below, such as within the range 250 to 340 K, such as 270 to 340 K, such as 280 to 330 K.

The temperature given for the transition temperature may refer to the starting temperature for the transition, which may refer to the onset of the transition in a cooling or heating cycle at a constant rate of temperature change.

Many of the organic materials for use in the present invention have a reversible phase transition that lies in the preferred temperature ranges. For example BDB has a phase transition near 320 K, and BDP has a phase transition near 265 K. Ammonium sulfate has a reversible phase transition near 220 K, although it is noted that this material displays inverse barocaloric effects, whilst the organic materials exemplified in the present case display conventional barocaloric effects.

An organic material may have a plurality of reversible phase transitions and one or each phase transition may occur at a temperature within the limits given above. Where an organic material has a plurality of reversible phase transitions, the methods of the invention may make use of one or more of these transitions, and typically one of these transitions. The methods of the invention may make use of the transition that lies closest to ambient temperature, such as closest to 270, 280 or 300 K.

Figure 1:
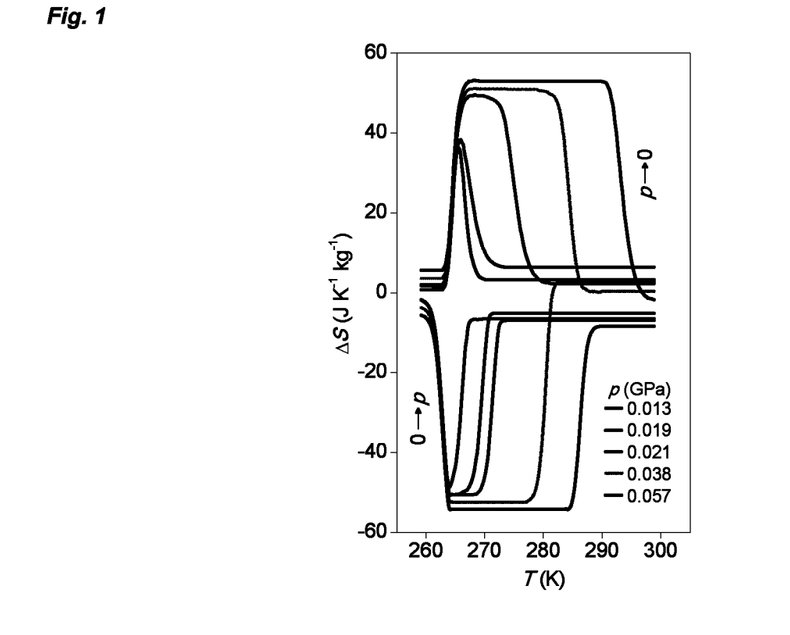
FIG. 1 shows the change in entropy ($J\ K^{-1}\ kg^{-1}$) with change in temperature (K) for barium dicalcium propionate (BDP) with the application and release of hydrostatic pressure on the organic material, where the lower portion of the graph (negative entropy change) shows data for the application of pressure from no applied pressure to the specified applied pressure (GPa), and the upper portion of the graph (positive entropy change) shows data for the release of pressure from the specified applied pressure (GPa) to no applied pressure.

The presence of a phase transition in the organic material may be established from the analysis of the heat flow performance of the material across a temperature range including the temperatures mentioned above. For example, the measurements of heat flow may be made by differential scanning calorimetry, such as using a temperature scan rate of 10 K min$^{-1}$. Lloveras et al., for example, describe a typical experiment for determining the transition temperature at atmospheric pressure (see the Methods section, *Calorimetry at Atmospheric Pressure* at page 5, together with FIG. 1(b)).

The phase transition temperature may be expressed as the transition temperature observed on heating, cooling, or as the average of the heating and cooling transitions.

An organic material may exhibit an endothermic transition upon heating through the transition point (thus the latent heat $Q_0$ is >0). It follows then that the organic materials will exhibit an exothermic transition upon cooling through the transition point (thus $Q_0$ is <0).

The entropy change at the transition, $|\Delta S_0|$, may be at least 10, at least 20, at least 50, at least 60, at least 70, at least 80, at least 90, at least 100, at least 110, at least 120 or at least 130 J K$^{-1}$ kg$^{-1}$, which is the magnitude of the change and this change may be positive or negative as appropriate during heating and cooling through the transition.

However, many of the organic materials tested by the present inventors have a considerably greater entropy change $|\Delta S_0|$ associated with phase transitions. Thus, the entropy change at the transition may be at least 150, at least 200, at least 250, at least 300 or at least 350, at least 400, or at least 450 J K$^{-1}$ kg$^{-1}$, which is the magnitude of the change and this change may be negative or positive as appropriate during cooling and heating through the transition. These entropy changes are considerably larger than those recorded for ammonium sulfate in the work of Lloveras et al. and also considerably larger than the values reported for metallic alloys (see Table 1 of Lloveras et al., for example).

The entropy change may refer to the entropy change for the entire transition. Alternatively, where a transition includes a first-order transition optionally with other order transitions, the entropy change may refer to the entropy change for the first-order transition only. Where there is a first-order transition which is a part of the entire transition, the entropy change for the first-order transition may be at least 30%, at least 40% or at least 50% of the entropy change of the entire transition.

The entropy change may be expressed as the entropy change observed on heating, cooling, or as the average of the heating and cooling transitions.

The entropy change at the transition may be determined by differential scanning calorimetry, as noted above.

The phase transition is accompanied by a change in the unit cell volume of the material, for example the unit cell volume may increase on heating through the phase transition. This is the change observed for conventional barocaloric materials. A decrease in the unit cell volume may be observed for inverse barocaloric materials.

The volume change at the transition may be at least 1.0, at least 5.0, at least 10, at least 15, at least 20, at least 25, at least 30, at least 40 or at least 50 mm$^3$g$^{-1}$.

The volume change at the transition may be a change of at least 0.1%, at least 0.2%, at least 0.5%, or at least 1.0%.

The figures given above relate to the magnitude of the change, and this change may be positive or negative as appropriate during heating and cooling through the transition. For example, the volume change may refer to an increase (positive) change in the volume, as such might be observed on heating through the phase transition.

The volume change may refer to the volume change for the entire transition. Alternatively, where a transition includes a first-order transition optionally with other order transitions, the volume change may refer to the volume change for the first-order transition only. Where there is a first-order transition which is a part of the entire transition, the change in volume for the first-order transition may be at least 30%, at least 40% or at least 50% of the volume change for the entire transition.

The change in the volume at the transition may be determined from X-ray diffraction analysis of the organic material during a temperature sweep across the phase transition (where the transition typically occurs across a temperature range). Lloveras et al., for example, describe a typical experiment for determining the volume change at atmospheric pressure (see the Methods section, *X-Ray Diffraction* at page 5, together with FIG. 1(d)). X-Ray diffraction measurements were used to determine the change in volume for the BDP and BDB organic materials described in the present case. The change in the volume at the transition may be determined from volumetric thermal expansion measurements, or from volumetric isothermal compressibility measurements at various temperatures.

The phase transition in the organic material may display a latent heat, $|Q_0|$, that is at least 1.0, at least 2.0 at least 3.0, at least 4.0, at least 5.0, at least 7.0, at least 9.0 or at least 10.0 kJ kg$^{-1}$.

Some organic materials, such as plastic crystals, have a phase transition that displays a latent heat, $|Q_0|$, that is very high. Thus, in some embodiments, the organic material may have a latent heat, $|Q_0|$, that is at least 25, at least 50, at least 75, at least 100, at least 150 or at least 200 kJ kg$^{-1}$.

The inorganic materials that have previously been used in the art for barocaloric cooling typically have latent heats in the range 2.0 to 13.2 kJ kg$^{-1}$ (see Table 1 of Lloveras et al., for example).

The latent heat values may be determined from the differential scanning calorimetry analysis of the material.

The organic materials display large barocaloric effects under applied pressure. In particular, the organic materials display a strong pressure-induced shift in the phase transition temperature.

The shift in transition temperature with applied pressure $dT_0/dp$, is relatively high for the organic components used herein. Thus, small or moderate pressures may be used to drive relatively large temperature changes.

In one embodiment, the change in transition temperature is at least 1 K, at least 2 K, at least 3 K, at least 4 K, at least 5 K, or at least 10 K, for example as measured for a change in applied pressure of 0.15 GPa. The figures given here relate to the magnitude of the change, which may be a positive change (for materials displaying conventional barocaloric effects) or a negative change (for materials displaying inverse barocaloric effects). In the worked examples of the present case, the organic materials are conventional and therefore they show a positive change in transition temperature. It will be understood that alternative materials may be used where a negative change in transition temperature is required. In one embodiment, the temperature change is an increase in the transition temperature under the applied pressure.

The temperature change refers to the adiabatic temperature change. The temperature change may be the temperature change derived from $-c\Delta T$ approximating to $T\Delta S=Q$ using the zero-pressure specific heat capacity c, the isothermal entropy change $\Delta S$ and the temperature of operation, T (Q is isothermal heat). It is appreciated that a large change in transition temperature with pressure does not always correspond to a large adiabatic temperature change, however in some instances it may do so.

The adiabatic temperature change can be calculated using the values of isothermal entropy change and heat capacity, which is a fundamental quantity known for most materials. The adiabatic temperature change may also be measured experimentally, for examples using the experimental set up described by Rodriguez et al.

In one embodiment, the change in transition temperature as a function of change in applied pressure, $dT_0/dp$, is at least 50, at least 100, at least 150, at least 200, at least 250, at least 400 or at least 500 K GPa$^{-1}$. The figures given here relate to the magnitude of the change, which may be positive, for example. The change in transition temperature as a function of change in applied pressure may be determined in heat flow experiments, during a heating step or a cooling step, for example at constant pressure. In the liquid crystal experiment described in the present case, the value of $dT_0/dp$ is 210 K GPa$^{-1}$.

The organic materials typically have a large refrigerant capacity, RC.

In one embodiment, the refrigerant capacity, RC, is at least 100, at least, 150, at least 200, or at least 250 J kg$^{-1}$. The RC values may be the value determined at an applied hydrostatic pressure of 0.1, 0.2 or 0.3 GPa. The RC values may be the value determined at an applied hydrostatic pressure of 0.075, 0.01, 0.03 or 0.1 GPa.

Refrigerant capacity may be determined from the product of the maximum values of isothermal entropy change with the full width at half maximum (FWHM) of the isothermal entropy peak with temperature, as the absolute value. Thus, the value of RC may be determined as the product of the maximum isothermal entropy change with the full width at half maximum of the peak in $\Delta S(T)$, thus RC=$|\Delta S \times (FWHM$ of $\Delta S(T))|$.

In the present case, BDP has an RC value of 77.6 J kg$^{-1}$ at 0.0075 GPa, BDB has an RC value of 560 J kg$^{-1}$ at 0.1029 GPa, and PCH5 has an RC value of 8,765 J kg$^{-1}$ at 0.104 GPa.

Methods and Uses

The present invention provides a method of cooling which uses the barocaloric effects of the organic materials described herein. Thus, the organic materials find use as cooling agents, for example within a cooling apparatus. The organic material may be referred to as a refrigerant.

The methods of the invention make use of the change in the thermal behaviour of an organic material under an applied pressure. The application of hydrostatic pressure to the organic material induces a change in the transition temperature. The barocaloric effect may be advantageously used within a heat pump cycle or a refrigeration cycle to provide heating or cooling respectively.

The methods of the invention allow for the use of organic materials displaying conventional barocaloric effects and inverse barocaloric effects.

The methods of the invention include the step of applying hydrostatic pressure to the organic material or releasing hydrostatic pressure from an organic material. Hydrostatic pressure refers to isotropic stress. This is to be contrasted with the uniaxial stresses that are applied to materials for use in elastocaloric cooling. Barocaloric materials have the advantage over elastocaloric materials in that they are not limited by the onset of plastic flow, which typically occurs at high applied pressures (typically hundreds of MPa).

The method of the invention may be performed in an environment at ambient temperature, such as a temperature from 0 to 35° C., such as 5 to 35° C., such as 10 to 30° C. (corresponding to 273.15 to 308.15 K, such as 278.15 to 308.15 K, such as 283.15 to 303.15 K). The methods of the invention allow for the generation of cooler and warmer localised regions within the environment as part of the barocaloric cooling process. For example, the organic material may become warmer or cooler than the ambient environment in the methods of the invention.

The methods of the invention include the step of applying a pressurizing force to the organic material, thereby to cause a change in the phase transition temperature, such as to increase the transition temperature (as shown in the worked examples of the present case). Organic materials exhibiting inverse barocaloric effects will exhibit a decrease in the transition temperature under the application of pressure.

In one embodiment, a sufficient pressuring force is applied to move the transition temperature to a temperature that is in an ambient temperature, such as a temperature from 0 to 35° C., such as 5 to 35° C., such as 10 to 30° C. (corresponding to 273.15 to 308.15 K, such as 278.15 to 308.15 K, such as 283.15 to 303.15 K).

The organic materials for use in the present case provide large changes in transition temperature with relatively small applied pressures. Thus, the value of $dT_0/dp$ is relatively high compared with many of the inorganic materials described previously.

The methods of the invention may use the organic material within conventional heating and cooling cycles in place of conventional materials, where the heating and cooling cycle is adapted to exploit the barocaloric effects of the organic materials.

Thus, the organic materials may be used within, for example, a Brayton cycle, an Ericsson cycle or a Carnot cycle to provide heating or cooling as required. The organic materials may also be used in alternative thermodynamic cycles to provide heating or cooling for a particular environment.

A method of the invention may comprise the steps of:
(i) applying hydrostatic pressure to an organic material; and
(ii) permitting heat flow from or to the organic material.

Where an organic material displays a conventional barocaloric effect upon application of hydrostatic pressure, step (ii) provides for the heat flow from the organic material. Where an organic material displays an inverse barocaloric effect, step (ii) provides for heat flow to the organic material.

A method of the invention may comprise the steps of:
(iii) releasing hydrostatic pressure from an organic material that is under applied pressure; and
(iv) permitting heat flow to or from the organic material.

Step (iii) may be referred to as a depressurisation step.

Where an organic material displays a conventional barocaloric effect upon release of hydrostatic pressure, step (iv) provides for the heat flow to the organic material. Where an organic material displays an inverse barocaloric effect, step (iv) provides for heat flow from the organic material.

The method of the invention may additionally comprise all of steps (i) to (iv) in a complete heat and cool cycle. Typically steps (i) and (ii) are undertaken prior to steps (iii) and (iv). The method may be a cooling method.

Where the method is a part of the Brayton cycle, for example, the pressure may be applied adiabatically, with, for example, a consequential heating of the organic material. In step (ii) there is a subsequent heat flow, for example from the organic material, which allows the organic material to return to its original temperature. In a further part of the cycle step, pressure may be released adiabatically with, for example, a consequential cooling of the organic material. In step (iv) there is a subsequent heat flow, for example to the organic material, which allows the organic material to return to its original temperature.

Where the method is a part of the Ericsson cycle, for example, the pressurisation and depressurisation steps are performed isothermally. Thus, the organic material is maintained at a substantially constant temperature, with heat transfer occurring, and not subsequent to, the pressurisation and depressurisation steps.

The methods of the invention allow heat flow to and from the organic material with changes in applied pressure. The ability of the organic material to absorb heat from the environment, in response to a pressure-induced phase transition, thereby cooling the environment, allows the organic material to be used as a cooling agent in a cooling apparatus.

In the methods of the invention the organic material may be used with a heat transfer fluid to and from which heat may be transferred. The heat transfer fluid is typically a liquid.

The heat transfer fluid may transfer heat to the organic material, thereby resulting in the relative cooling of the heat transfer fluid. The cooled heat transfer fluid may then be taken from the organic material and delivered to a location where cooling is desired.

The heat transfer fluid may accept heat transfer from the organic material, thereby resulting in the relative cooling of the organic material. The heated heat transfer fluid may then be taken from the organic material and delivered to a location for cooling, such as a radiator or another such heat exchanger, for example for cooling to ambient temperature.

It is not necessary for the heat transfer fluid to directly contact the organic material, and the heat transfer may occur via a heat exchanger.

A heat exchanger may use a heat switch, such as a thermoelectric heat switch, an electromechanical heat switch, a solid-state thermal diode or a heat pipe. The use of compact switches of these types may improve the design of the cooling devices, and enhance their energy efficiency.

The organic material may also be used together with a regenerator in order to alter or increase the temperature range of operation. The organic material may itself be used as a regenerator.

The barocaloric effects observed with the organic materials can be achieved at relatively low pressures. Accordingly, the pressurizing force applied to the organic material may be relatively low in the methods of the invention.

In the methods of the invention, the hydrostatic pressure is applied in step (i) near the transition temperature of the organic material. It is here that large barocaloric effects are observed. For example, the hydrostatic pressure is applied at a temperature that is within 50 K, within 20 K, within 15 K, within 10 K, such as within 5 K, such as within 2 K, such as within 1 K, such as within 0.5 K of the transition temperature, which is the transition temperature of the organic material absent the applied hydrostatic pressure (for example, the transition temperature under ambient pressure).

In the methods of the invention, the hydrostatic pressure may be applied at a level sufficient to induce the phase transition.

When a hydrostatic pressurizing force is applied, the pressure may be at most 1.0 GPa, at most 0.5 GPa, at most 0.2 GPa, at most 0.15 GPa, at most 0.10 GPa, at most 0.09 GPa, at most 0.07 GPa, at most 0.06 GPa, at most 0.05 GPa, at most 0.04 GPa, at most 0.03 GPa, at most 0.02 GPa or at most 0.01 GPa.

When a pressurizing force is applied, the pressure may be at least 0.1 MPa, at least 0.5 MPa, at least 1.0 MPa, or at least 5.0 MPa.

The pressure applied may be a hydrostatic pressure in a range with the lower and upper limits selected from the values given above. For example, the hydrostatic pressure may be a pressure in the range 1.0 MPa to 0.1 GPa.

The pressurizing force is the change in pressure applied to the organic material. Typically the change in pressure is to or from ambient (atmospheric) pressure, such as to or from about 101 kPa.

Where the hydrostatic pressure is applied in step (i), there may be a rapid increase in pressure. Where the hydrostatic pressure is released in step (iii), the pressure may be a rapid release. This is preferred for systems operating as part of or whole of a Brayton cycle, in order to achieve adiabatic conditions.

Where the hydrostatic pressure is applied in step (i), there may be a slow increase in pressure. Where the hydrostatic pressure is released in step (iii), the pressure may be a slow release. This is preferred for systems operating as part of or whole of an Ericsson cycle, in order to achieve isothermal conditions.

The values of the transition temperature under a constant applied pressure (constant hydrostatic pressure) may be determined, for example using a differential thermal analyser operating under hydrostatic pressure at a heating or cooling rate of 1-4 k min$^{-1}$.

The application of hydrostatic pressure may be achieved by applying pressure to the organic material contained provided within a pressure-transmitting medium. Pressure-transmitting media are well known in the art and include liquid and solid materials. Typically, the pressure-transmitting medium is not water.

An example of a pressure-transmitting liquid includes alkoxy silane materials, such as DW-Therm, available from Huber Kältemaschinenbau GmbH.

An example of a pressure-transmitting solid is alumina powder.

The methods of the invention may be for use in cooling foodstuffs or beverages.

The methods of the invention may be for use in cooling medicines.

The methods of the invention may be for use in cooling biological samples, such as tissues.

The methods of the invention may be for use in cooling electronic devices, such as devices for analytical measurements.

The methods of the invention may be used to cool air, such as air within building and vehicles.

Cooling Apparatus

The present invention provides a cooling apparatus containing an organic material as described herein, where the cooling apparatus is adapted to provide barocaloric cooling using the organic material.

The cooling apparatus comprises the organic material. The cooling apparatus may be provided with means for applying pressure to the organic component. The cooling apparatus may also be provided with means for transferring heat to and from the organic material.

Typically, the organic material is provided within a pressure transmitting medium, such as a pressure transmitting fluid, which is contained within a piston head space (or the piston chamber). The pressure transmitting medium is not essential, and pressure may be applied directly to the organic material, such as a material having a liquid phase, such as liquid crystals.

Thus, in one aspect the present invention provides a piston comprising the organic material within the head space.

The cooling apparatus may be for use in cooling foodstuffs and beverages, thus the cooling apparatus may be a component of a refrigerator or a freezer.

The cooling apparatus may find general use in cooling air, thus the cooling apparatus may be a component of an air-conditioning unit.

In other aspects of the invention there is more generally provided a heat engine for the transfer of heat between environments, where the heat engine has an organic material as a barocaloric working agent. Whilst the predominant use of refrigerants is in refrigerators and air-conditioning units, the principles underlying the mechanism of cooling an environment may also be used to heat an indoor environment, for example within an air-source heat pump.

Here, a cool organic material in a first phase may be warmed by the outside ambient environment (including indirectly via a heat transfer fluid). The warmed organic material may then be taken isothermally to a second phase, with an associated heat transfer from the environment to the organic material (including indirectly via a heat transfer fluid). The organic material is then returned to the indoor environment, where it is permitted to return to the second phase, with an associated heat transfer from the organic material to the indoor environment.

The broad aspects of the invention encompass methods of heat transfer to and from an organic material using barocaloric effects. Thus, the methods of the invention relate to methods of cooling and methods of heating.

Other Preferences

Each and every compatible combination of the embodiments described above is explicitly disclosed herein, as if each and every combination was individually and explicitly recited.

Various further aspects and embodiments of the present invention will be apparent to those skilled in the art in view of the present disclosure.

"and/or" where used herein is to be taken as specific disclosure of each of the two specified features or components with or without the other. For example "A and/or B" is to be taken as specific disclosure of each of (i) A, (ii) B and (iii) A and B, just as if each is set out individually herein.

Unless context dictates otherwise, the descriptions and definitions of the features set out above are not limited to any particular aspect or embodiment of the invention and apply equally to all aspects and embodiments which are described.

Certain aspects and embodiments of the invention will now be illustrated by way of example and with reference to the figures described above.

Experimental Details and Results

The analysis of the organic materials described in the present case follows that of the work described by some of the present inventors in Lloveras et al. and Stern-Taulats et al., the contents of both of which are hereby incorporated by reference in their entirety.

Materials

BDP and BDB were prepared, as needed, using standard techniques. An example preparation for BDP is set out below.

Propionic acid (1 L), 100 g of barium carbonate (100 g) and 100 g of calcium carbonate (100 g) were purchased from Sigma Aldrich. Their respective purities were 99%, 99.8% and 99.98%, and the reagents were used directly without further purification.

BDP (around 10 g yield) was synthesized from propionic acid (10 mL), barium carbonate (3 g) and of calcium carbonate (3 g).

Barium carbonate or calcium carbonate, when combined with propionic acid in aqueous solution generates the corresponding propionate hydrate salt. The molar mass of barium carbonate and calcium carbonate could not be immediately established as the two carbonates absorb moisture from the air. For this reason, the barium propionate and calcium propionate were initially made separately. The mass of propionate hydrates is unaffected by humidity. The two propionate hydrates were combined together, to form BDP, keeping a reproducible molar ratio.

The plastic and liquid crystals, NPG and PCH5, were purchased from commercial suppliers. 1-Adamantanol was also purchased from a commercial supplier.

Measurements

Table 1 sets out the values for $T_0$, $|Q_0|$, $|\Delta S_0|$, $dT_0/dp$, and $|\Delta V_0|$, determined from the analysis of the organic materials BDP and BDB.

Table 2 sets out the values for $T_0$, $|Q_0|$, $|\Delta S_0|$, $dT_0/dp$, and $|\Delta V_0|$, determined from the analysis of various plastic crystals.

Table 3 sets out the values for $T_0$, $|Q_0|$, $|\Delta S_0|$, $dT_0/dp$, and $|\Delta V_0|$, determined from the analysis of the liquid crystal PCH5.

Figure 4:
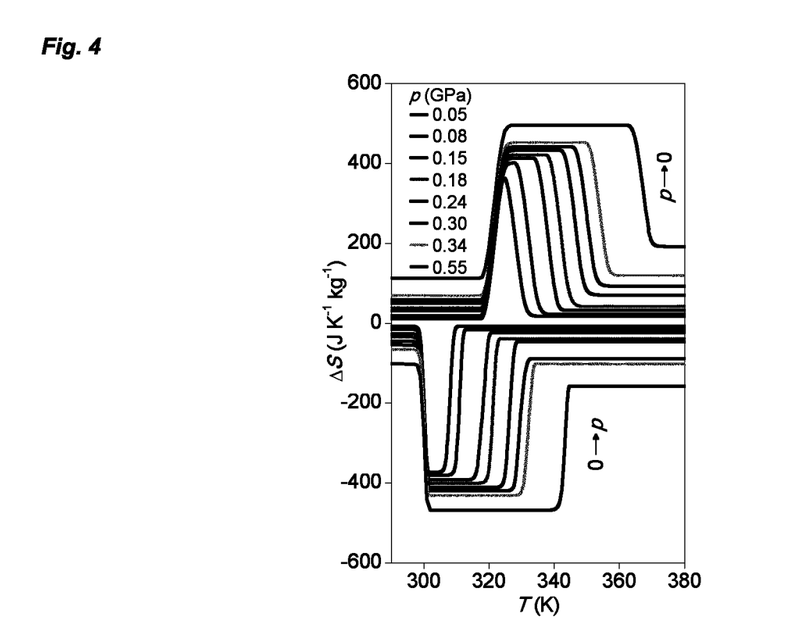
FIG. 4 shows the change in entropy ($J\ K^{-1}\ kg^{-1}$) with change in temperature (K) for a plastic crystal neopentyl glycol (NPG) with the application and release of pressure on the organic material, where the lower portion of the graph shows data for the application of pressure from no applied pressure to the specified applied pressure (GPa), and the upper portion of the graph shows data for the release of pressure from the specified applied pressure (GPa) to no applied pressure.
Figure 5:
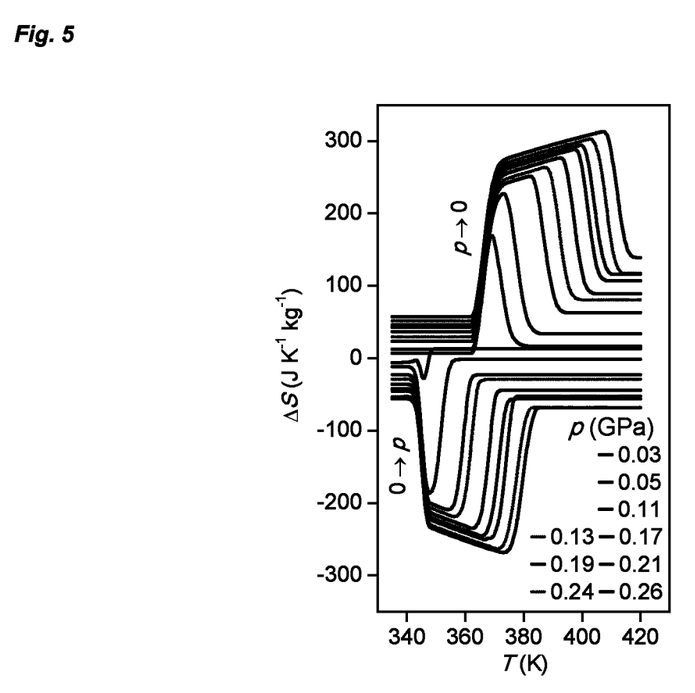
FIG. 5 shows the change in entropy ($J\ K^{-1}\ kg^{-1}$) with change in temperature (K) for a plastic crystal 1-adamantanol with the application and release of pressure on the organic material, where the lower portion of the graph shows data for the application of pressure from no applied pressure to the specified applied pressure (GPa), and the upper portion of the graph shows data for the release of pressure from the specified applied pressure (GPa) to no applied pressure.

The performances of BDP, BDB, PCH5 and NPG under different applied pressures are shown in FIGS. 1 to 4. Additionally, the performance of the plastic crystal 1-adamantanol is shown in FIG. 5.

$T_0$, $|\Delta S_0|$ and $|Q_0|$ were determined via differential scanning calorimetry at ambient pressure. $dT_0/dp$ was determined via differential thermal analysis under applied hydrostatic pressure. $|\Delta V_0|$ was determined, for example, from temperature-dependent X-ray diffraction analysis at ambient pressure.

Barocaloric quantities were determined via quasi-direct methods, using differential thermal analysers that operate under hydrostatic pressure, with Peltier modules or thermocouples heat sensors, as for example described in Lloveras et al. (see BC Effects in AS at page 3, together with reported results in FIG. 3, and the Methods section at page 5).

Figure 2:
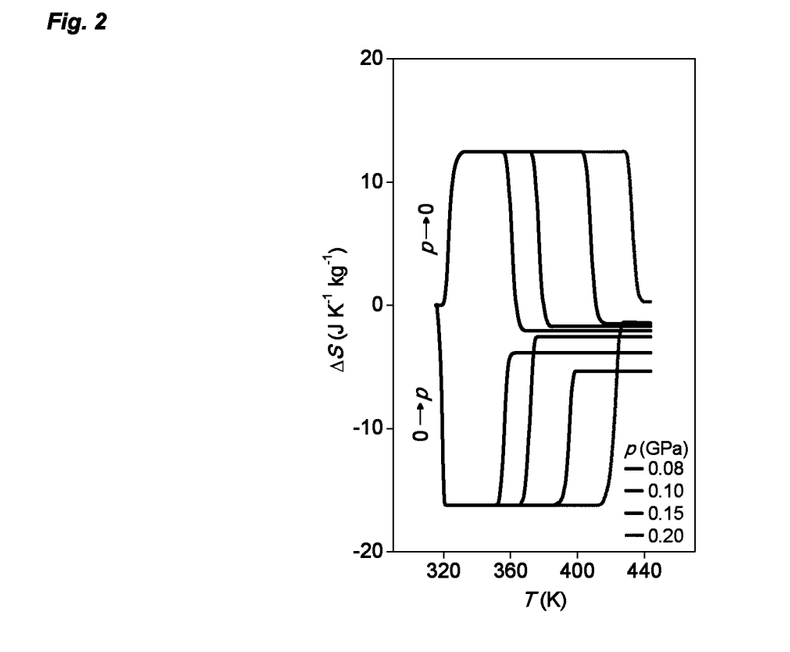
FIG. 2 shows the change in entropy ($J\ K^{-1}\ kg^{-1}$) with change in temperature (K) for barium dicalcium butyrate (BDB) with the application and release of pressure on the organic material, where the lower portion of the graph (negative entropy change) shows data for the application of pressure from no applied pressure to the specified applied pressure (GPa), and the upper portion of the graph (positive entropy change) shows data for the release of pressure from the specified applied pressure (GPa) to no applied pressure.
Figure 3:
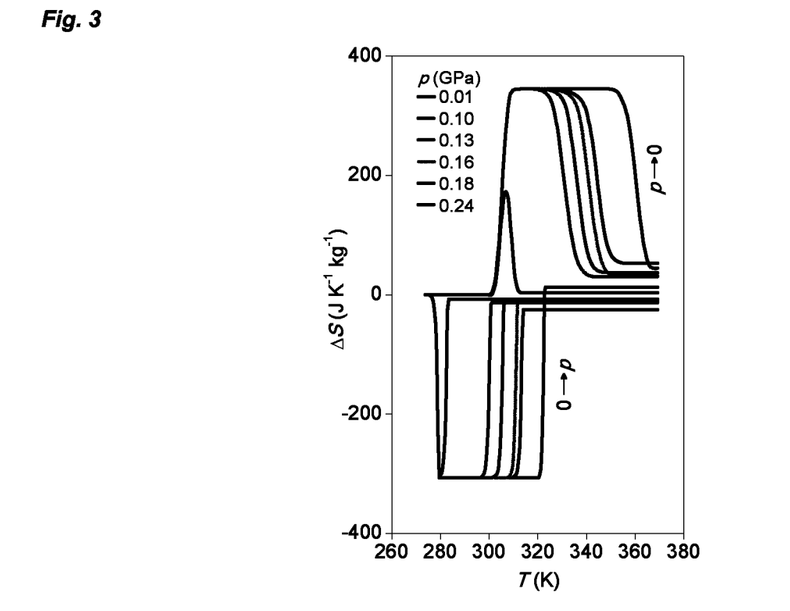
FIG. 3 shows the change in entropy ($J\ K^{-1}\ kg^{-1}$) with change in temperature (K) for the liquid crystal 4-(trans-4-pentylcyclohexyl) benzonitrile (PCH5) with the application and release of pressure on the organic material, where the lower portion of the graph shows data for the application of pressure from no applied pressure to the specified applied pressure (GPa), and the upper portion of the graph shows data for the release of pressure from the specified applied pressure (GPa) to no applied pressure.

Differential thermal analysis under hydrostatic pressure was performed as described by Mañosa et al. The data is shown in FIGS. 2 and 4 for BDB and PCH5.

TABLE 1

Properties of Representative Organic Materials

| Organic Material | $T_0$ (K) | $\|Q_0\|$ (J g$^{-1}$) | $\|\Delta S_0\|$ (J K$^{-1}$ kg$^{-1}$) | $dT_0/dp$ (K/GPa) | $\|\Delta V_0\|$ (mm$^3$ g$^{-1}$) |
|---|---|---|---|---|---|
| BDP Ba$^{2+}$Ca$^{2+}{}_2$[C$_2$H$_5$COO$^-$]$_6$ | 267 | 10.7 | 42 | 332 | 17.5 |
| BDB Ba$^{2+}$Ca$^{2+}{}_2$[C$_3$H$_7$COO$^-$]$_6$ | 325 | 4.72 | 14.5 | 500 | 10.1 |

The table shows transition temperature $T_0$, latent heat $|Q_0|$, entropy change $|\Delta S_0|$, shift of transition temperature with applied pressure $dT_0/dp$, and volume change across the transition $|\Delta V_0|$. The organic materials are barium and calcium salts of the organic compounds butyric acid and propionic acid.

TABLE 2

Properties of Representative Plastic Crystal Organic Materials

| Organic Material | $T_0$ (K) | $\|Q_0\|$ (J g$^{-1}$) | $\|\Delta S_0\|$ (J K$^{-1}$ kg$^{-1}$) | $dT_0/dp$ (K/GPa) | $\|\Delta V_0\|$ (mm$^3$ g$^{-1}$) |
|---|---|---|---|---|---|
| PG | 357.5 | 177.3 | 495.2 | 103.0 | 51.0 |
| NPG | 314.6 | 122.9 | 389.8 | 119.6 | 46.7 |
| NPA | 236.5 | 45.38 | 191.7 | 237.0 | 45.5 |
| MN | 260.1 | 51.15 | 196.5 | 130.7 | 25.7 |
| MNP | 312.0 | 140.0 | 449.1 | 81.0 | 36.4 |
| AMP | 352.6 | 221.6 | 629.7 | 76.0 | 48.1 |
| TRIS | 406.8 | 280.7 | 691.0 | 60.6 | 41.8 |
| 2-Br-Adamantane | 277.9 | 56.20 | 202.2 | 243.0 | 52.8 |
| 2-O-Adamantane | 221.0 | 52.79 | 239.0 | 181.0 | 43.5 |
| 1-Adamantanol | 359.0 | 85.40 | 236.5 | 178.0 | 42.0 |
| 2-Adamantanol | 389.3 | 52.42 | 134.6 | 64.3 | 4.60 |
| 1,3-Dimethyladamantane | 367.5 | 46.56 | 210.7 | 288.0 | 60.7 |

The table shows transition temperature $|T_0|$, latent heat $|Q_0|$, entropy change $|\Delta S_0|$, shift of transition temperature with applied pressure $dT_0/dp$, and volume change across the transition $|\Delta V_0|$. PG=pentaglycerine; 2-(hydroxymethyl)-2-methylpropane-1,3-diol. NPG=neopentylglycol; 2,2-dimethyl-1,3-propanediol. NPA=neopentyl alcohol; 2,2-dimethyl-1-propanol. MN=2-methyl-2-nitropropane. MNP=2-methyl-2-nitro-1-propanol. AMP=2-amino-2-methyl-1,3-propanediol. TRIS=Tris(hydroxymethyl)aminomethane.

TABLE 3

Properties of a Representative Liquid Crystal Organic Material

| Organic Material | $T_0$ (K) | $\|Q_0\|$ (J g$^{-1}$) | $\|\Delta S_0\|$ (J K$^{-1}$ kg$^{-1}$) | $dT_0/dp$ (K/kbar) | $\|\Delta V_0\|$ (mm$^3$ g$^{-1}$) |
|---|---|---|---|---|---|
| PCH5 4-(trans-4-pentylcyclohexyl)benzonitrile | 303 | 87.6 | 290 | 210 | 60.8 |

The table shows transition temperature $T_0$, latent heat $|Q_0|$, entropy change $|\Delta S_0|$, shift of transition temperature with applied pressure $dT_0/dp$, and volume change across the transition $|\Delta V_0|$.

Figure 6:
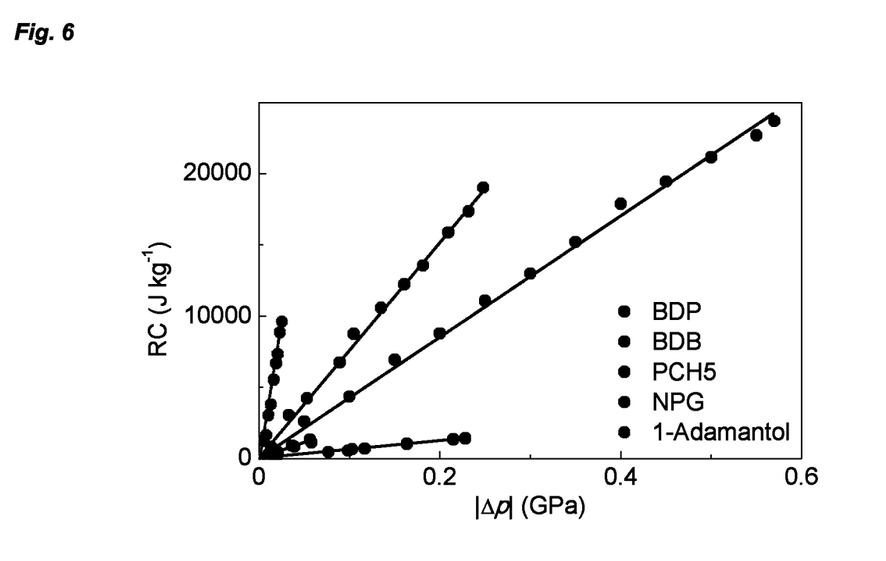
FIG. 6 shows the change in refrigerant capacity, RC, (J kg$^{-1}$) with the change in hydrostatic pressure |Δp| for the organic materials 1-adamantanol, PCH5, NPG, BDP, and BDB (from top to bottom). The solid lines are linear fits to the data.

FIG. 6 shows the refrigerant capacity, RC, values for the organic materials, BDP, BDB and PCH5, at different applied hydrostatic pressures.

REFERENCES

All documents mentioned in this specification are incorporated herein by reference in their entirety.

Crossley et al. AIP Advances 2015, 5, 067153
Lloveras et al. *Nature Commun.* 2015, 6, Article no. 8801
Mañosa et al., *Nat. Mater.* 2010, 9, 478
Matsunami et al. *Nature Materials* 2015, 14, 73
Mencke et al. *Review of Scientific Instruments* 1993, 64, 383
Mikhaleva et al., *Ferroelectrics* 2012 430, 78
Patel et al. Appl. Phys. Lett. 2016, 108, 072903
Rodriguez et al. *J. Appl. Phys. Chem.* 1982, 53, 6536
Roland et al. *Chem. Mater.* 2004, 16, 857
Stern-Taulats et al. *APL Materials* 2016, 4, 091102
Timmermans *J. Phys. Chem. Solids* 1961, 18, 1
Wunderlich et al. *Advances in PolymerScience* 1984, 60/61, Springer-Verlag, Berlin
Yano et al. *J. Phys. Soc. Japan.* 1989, 58, 577
Xie and Zhu, arXiv: 1609.07939

The invention claimed is:

1. A method comprising employing an organic material as a barocaloric cooling or heating agent, wherein the method comprises:
   (i) applying hydrostatic pressure to an organic material;
   (ii) permitting heat flow from or to the organic material;
   (iii) releasing hydrostatic pressure from an organic material that is under applied pressure; and
   (iv) permitting heat flow to or from the organic material.

2. The method according to claim 1, wherein the organic material is an organic compound or a salt thereof optionally wherein at least one of the following is present:
   the organic material has a molecular weight of at most 2,000;
   the organic material has a molecular weight of at least 50;
   the organic material is an organic compound or a salt thereof, and the organic compound has two or more carbon-carbon bonds;
   the organic material is an organic compound or a salt thereof, and the organic compound has two or more carbon-hydrogen bonds; and
   the organic material is a liquid crystal or a plastic crystal.

3. The method according to claim 1, wherein the organic material is a plastic crystal optionally wherein:
   the plastic crystal comprises a cycloalkyl group, and the cycloalkyl group is an adamantantyl group optionally substituted with one or more groups selected from the group consisting of alkyl, halo, hydroxyl and oxo; or the plastic crystal comprises an alkyl group, and the alkyl
group is a $C_{4-20}$ alkyl group, optionally substituted with
one or more groups selected from the group consisting
of hydroxyl, amino and nitro.

4. The method according to claim 1, wherein the organic material is a liquid crystal optionally wherein the liquid crystal comprises one or more groups selected from alkyl, cycloalkyl and aryl.

5. The method according to claim 1, wherein the organic material is an alkyl carboxylic acid or an alkyl carboxylate salt optionally wherein the alkyl group has three or more carbon atoms; or the organic material is a hydrocarbon.

6. The method according to claim 1, wherein the organic material has a phase transition at a temperature within the range 200 to 450 K, optionally wherein the phase transition of the organic material is a first-order phase transition.

7. The method according to claim 1, wherein at least one of the following is present:
the organic material has an entropy change at a phase transition, $|\Delta S_0|$, of at least 10 J $K^{-1}$ $kg^{-1}$;
a phase transition in the organic material displays a latent heat, $|Q_0|$, that is at least 1 kJ $kg^{-1}$;
the organic material has a volume change at the phase transition of at least 1.0 $mm^3$ $g^{-1}$; and
the organic material is provided within a pressure-transmitting medium.

8. The method according to claim 1, wherein hydrostatic pressure is applied to the organic material at a temperature that is within 50 K, of a phase transition temperature of the organic material, where the phase transition temperature is the temperature for the phase transition in the absence of the hydrostatic pressure optionally wherein:
the applied hydrostatic pressure is at most 1.0 GPa; or
the applied hydrostatic pressure is at least 0.1 MPa.

9. A method of barocaloric cooling or heating, the method comprising the steps of:
(i) applying hydrostatic pressure to an organic material;
(ii) permitting heat flow from or to the organic material;
(iii) releasing hydrostatic pressure from an organic material that is under applied pressure; and
(iv) permitting heat flow to or from the organic material.

10. The method according to claim 9, wherein the organic material is an organic compound or a salt thereof optionally wherein at least one of the following is present:
the organic material has a molecular weight of at most 2,000;
the organic material has a molecular weight of at least 50;
the organic material is an organic compound or a salt thereof, and the organic compound has two or more carbon-carbon bonds;
the organic material is an organic compound or a salt thereof, and the organic compound has two or more carbon-hydrogen bonds; and
the organic material is a liquid crystal or a plastic crystal.

11. The method according to claim 9, wherein the organic material is a plastic crystal optionally wherein:
the plastic crystal comprises a cycloalkyl group, and the cycloalkyl group is an adamantantyl group optionally substituted with one or more groups selected from the group consisting of alkyl, halo, hydroxyl and oxo; or
the plastic crystal comprises an alkyl group, and the alkyl group is a $C_{4-20}$ alkyl group, optionally substituted with one or more groups selected from the group consisting of hydroxyl, amino and nitro.

12. The method according to claim 9, wherein the organic material is a liquid crystal optionally wherein the liquid crystal comprises one or more groups selected from alkyl, cycloalkyl and aryl.

13. The method according to claim 9, wherein the organic material is an alkyl carboxylic acid or an alkyl carboxylate salt optionally wherein:
the alkyl group has three or more carbon atoms; or the organic material is a hydrocarbon.

14. The method according to claim 9, wherein the organic material has a phase transition at a temperature within the range 200 to 450 K, optionally wherein the phase transition of the organic material is a first-order phase transition.

15. The method according to claim 9, wherein at least one of the following is present:
the organic material has an entropy change at a phase transition, $|\Delta S_0|$, of at least 10 J $K^{-1}$ $kg^{-1}$;
a phase transition in the organic material displays a latent heat, $|Q_0|$, that is at least 1 kJ $kg^{-1}$; and
the organic material has a volume change at the phase transition of at least 1.0 $mm^3$ $g^{-1}$;
or the organic material is provided within a pressure-transmitting medium.

16. The method according to claim 9, wherein hydrostatic pressure is applied to the organic material at a temperature that is within 50 K of a phase transition temperature of the organic material, where the phase transition temperature is the temperature for the phase transition in the absence of the hydrostatic pressure optionally wherein:
the applied hydrostatic pressure is at most 1.0 GPa; or
the applied hydrostatic pressure is at least 0.1 MPa.

17. A cooling or heating apparatus comprising an organic material as a barocaloric cooling or heating agent and a means for transferring heat to and from the organic material, wherein the means for transferring heat to and from the organic material is suitable to transfer heat for a barocaloric transition with a latent heat, $|Q_0|$, that is at least 25 kJ $kg^{-1}$.

18. The apparatus according to claim 17, wherein the organic material is an organic compound or a salt thereof optionally wherein at least one of the following is present:
the organic material has a molecular weight of at most 2,000;
the organic material has a molecular weight of at least 50;
the organic material is an organic compound or a salt thereof, and the organic compound has two or more carbon-carbon bonds;
the organic material is an organic compound or a salt thereof, and the organic compound has two or more carbon-hydrogen bonds; and
the organic material is a liquid crystal or a plastic crystal.

19. The apparatus according to claim 17, wherein the organic material is a plastic crystal optionally wherein:
the plastic crystal comprises a cycloalkyl group, and the cycloalkyl group is an adamantantyl group optionally substituted with one or more groups selected from the group consisting of alkyl, halo, hydroxyl and oxo; or
the plastic crystal comprises an alkyl group, and the alkyl group is a $C_{4-20}$ alkyl group, optionally substituted with one or more groups selected from the group consisting of hydroxyl, amino and nitro.

20. The apparatus according to claim 17, wherein the organic material is a liquid crystal optionally wherein the liquid crystal comprises one or more groups selected from alkyl, cycloalkyl and aryl.

21. The apparatus according to claim 17, wherein the organic material is an alkyl carboxylic acid or an alkyl carboxylate salt optionally wherein the alkyl group has three or more carbon atoms; or the organic material is a hydrocarbon.

22. The apparatus according to claim 17, wherein the organic material has a phase transition at a temperature within the range 200 to 450 K optionally wherein the phase transition of the organic material is a first-order phase transition.

23. The apparatus according to claim 17, wherein at least one of the following is present:

the organic material has an entropy change at a phase transition, $|\Delta S_0|$, of at least 10 J K$^{-1}$ kg$^{-1}$;

a phase transition in the organic material displays a latent heat, $|Q_0|$, that is at least 1 kJ kg$^{-1}$;

the organic material has a volume change at the phase transition of at least 1.0 mm$^3$ g$^{-1}$; and the organic material is provided within a pressure-transmitting medium.

* * * * *